US006247383B1

United States Patent
Chun

(12) United States Patent
(10) Patent No.: US 6,247,383 B1
(45) Date of Patent: Jun. 19, 2001

(54) TWO-PART TORQUE-COMPENSATING SUSPENSION

(75) Inventor: Gil-Hwan Chun, Hamminkeln (DE)

(73) Assignee: A. Friedr. Flendep AG, Bocholt (DE)

( * ) Notice: Subject to any disclaimer, the term of this patent is extended or adjusted under 35 U.S.C. 154(b) by 0 days.

(21) Appl. No.: 09/405,700

(22) Filed: Sep. 24, 1999

(30) Foreign Application Priority Data

Oct. 18, 1998 (DE) ............................................. 198 46 328

(51) Int. Cl.$^7$ ............................. F16H 57/02; F16M 5/00
(52) U.S. Cl. ........................ 74/606 R; 248/659; 248/671
(58) Field of Search ................... 74/606 R; 248/637, 248/658, 659, 671, 675

(56) References Cited

U.S. PATENT DOCUMENTS

| 888,535 | * | 5/1908 | Royce | 248/659 X |
| 1,161,531 | * | 11/1915 | Royce | 248/659 X |
| 1,664,129 | * | 3/1928 | Pallenberg | 248/591 |
| 2,108,515 | * | 2/1938 | Summers | 248/659 X |
| 4,500,054 | * | 2/1985 | Osborn | 244/54 |
| 5,003,835 | * | 4/1991 | Ackermann et al. | 74/411 |

* cited by examiner

Primary Examiner—Allan D. Herrmann
(74) Attorney, Agent, or Firm—Max Fogiel

(57) ABSTRACT

A two-part torque-compensating suspension for a transmission 2 mounted around the shaft 1 of a machine. The suspension includes a rocking plate 3. The rocking plate is preferably symmetrical with respect to a plane extending through the shaft. The plate is fastened to the non-moving parts of the transmission and connected to fixed pedestals 8. Two levers 5 extend between the rocking plate and the pedestals. The levers' inner arms are connected by a secondary connecting rod 6.

9 Claims, 4 Drawing Sheets

TWO-PART TORQUE-COMPENSATING SUSPENSION

BACKGROUND OF THE INVENTION

The present invention concerns a two-part torque-compensating suspension for a transmission mounted around the shaft of a machine and.

Transmissions mounted torsion-resistant around the shaft of a machine require torque-compensating suspensions to apply the opposing torque to a fixed point on the base of the machinery. That point is a precisely prescribed distance from the shaft. The suspension must allow displacement of the shaft's axial midpoint. Such displacements occur in mechanisms that drive rollers when materials of different thickness are being processed and in shredders when the driven shaft is hydraulically adjusted. Displacement can also occur as the result of thermal expansion.

One known two-part torque-compensating suspension includes connecting rods connected to each other by a torque-compensation shaft and engaging a rocking plate. Each end of the torque-compensation shaft rests in a pedestal mounted on a perpendicular wall or on a horizontal base. Such suspensions relieve the machine's bearings of all transverse forces with the exception of weight. Displacements on the part of the main shaft are transmitted free of force in relation to the base of the machine.

SUMMARY OF THE INVENTION

The object of the present invention is a torque-compensating suspension of the aforesaid genus that will transmit forces of reaction to the base by simple means without applying load to the shaft.

As in the generic suspension, the only force the shaft is subjected in accordance with the present invention to is weight, and displacements of the shaft are transmitted free of force in relation to the base. The system of levers, however, simplifies and renders the overall design more cost-effective in that, since the linkages are simply bores, there is no need for an expensive torque-compensation shaft.

BRIEF DESCRIPTION OF THE DRAWINGS

Various embodiments of the present invention will now be specified with reference to the accompanying drawing, wherein.

DESCRIPTION OF THE PREFERRED EMBODIMENTS

Figure 1:
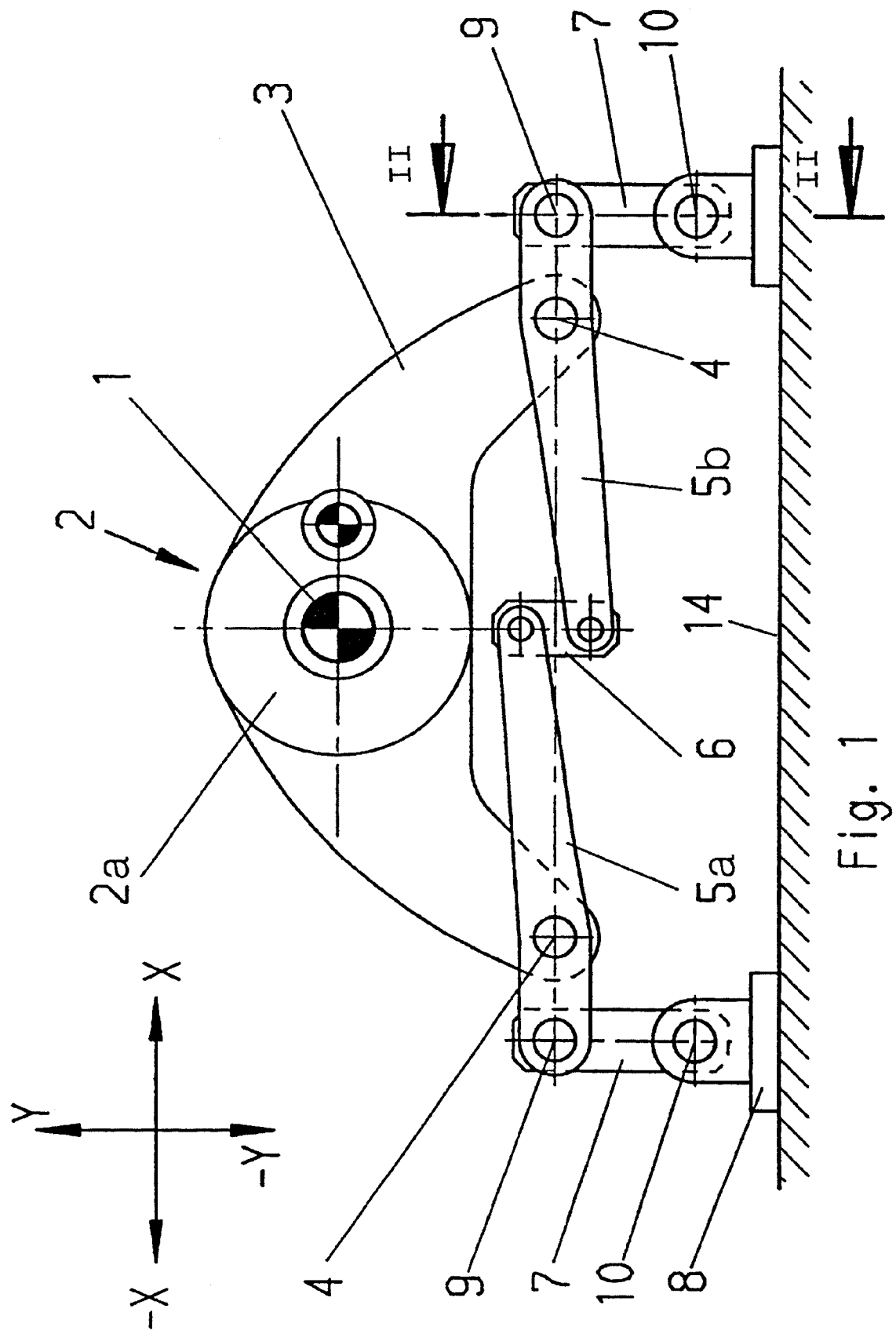
FIG. 1 is a side view of one embodiment of a torque-compensating suspension.

A transmission 2, a planetary gear by way of example, is mounted torsion-resistant around the shaft of a machine. The opposing torque exeerted by transmission 2 is accommodated by a rocking plate or lever plate 3 secured to the transmission's housing or stationary part 2a. Plate 3 is preferably symmetrical to a plane extending through the machine's shaft 1.

The forces of reaction acting on pivots 4 are equal in dimension but opposite in direction and accordingly constitute a force couple that exerts a torque in opposition to the transmission's output torque. The opposing directions prevent load on the bearings, the main-shaft bearings and the transmission output-end bearings, that is, due to forces exerted by the suspension.

The torque-compensating suspension illustrated in FIG. 1 includes levers 5a, 5b with arms of unequal length, one of these levers pivoting in each pivot 4 in rocking plate 3. The inner arms of levers 5a, 5b are connected by a secondary connecting rod 6. The linkages between levers 5a, 5b and connecting rod 6 extend preferably but not necessarily along the plane of symmetry of rocking plate 3. The outer arm 7 of each lever 5a, 5b pivots around a pivot 9 in a primary connecting rod 7. Primary connecting rod 7 pivots in turn around a pivot 10 in a pedestal 8. Pedestals 8 are rigidly attached to the machine's base or housing 14 and constitute the only stationary points in the whole system.

Figure 3:
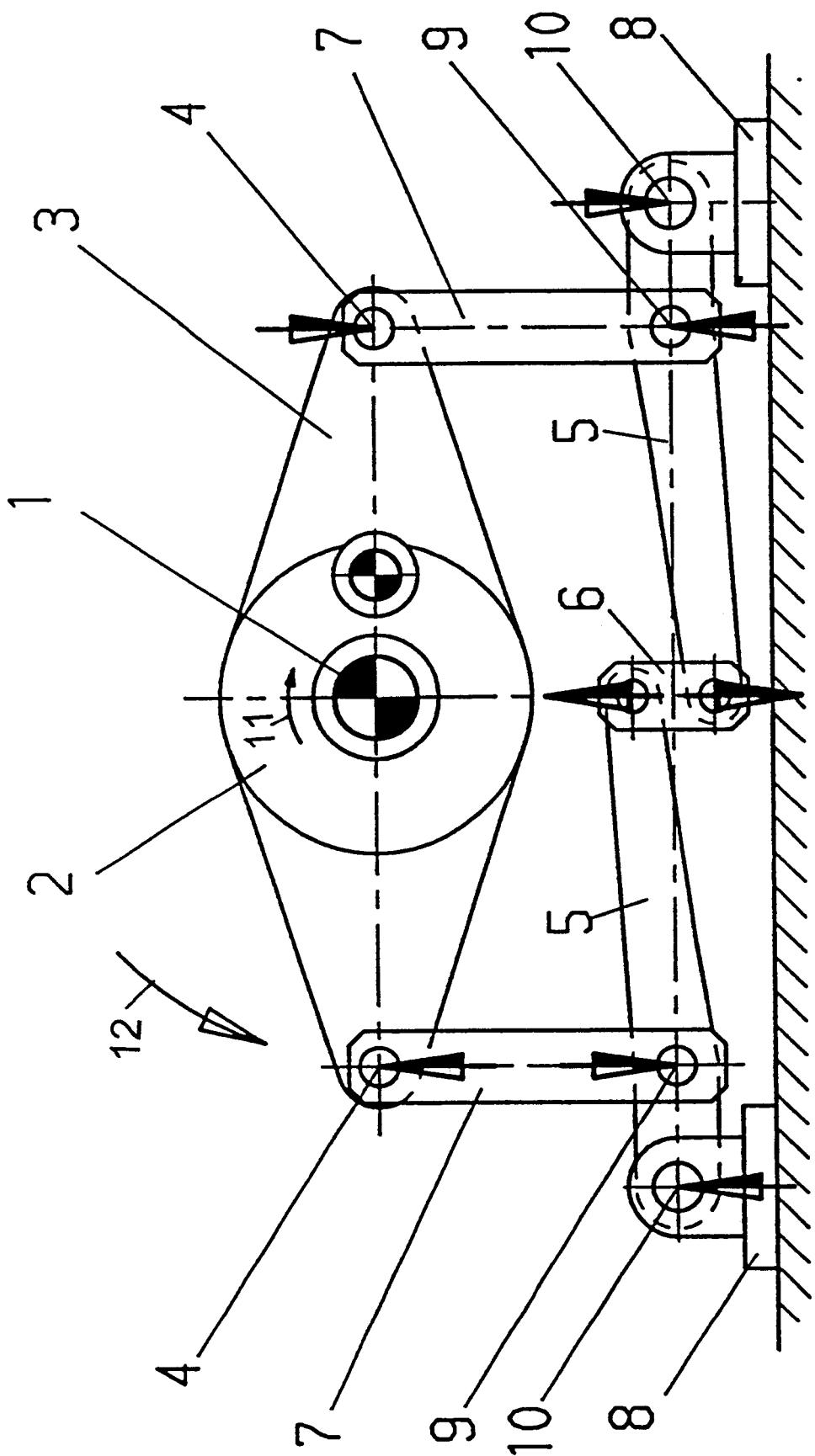
FIG. 3 is a side view of another embodiment.

Each primary connecting rod 7 in the torque-compensating suspension illustrated in FIG. 3 pivots at one end around a linkage 4 that connects it to rocking plate 3 and at the other end around a pivot 9 that connects it to a lever 5a, 5b. The inner arms of levers 5a, 5b this embodiment as well are pivoted to secondary connecting rod 6. The outer arms 7 of levers 5a, 5b are pivoted to pedestals 8.

The levers 5a, 5b in the embodiments illustrated in FIGS. 1 and 3 accordingly allow displacement of the machine's axis in both horizontal direction X, −X and vertical direction Y, −Y. When shaft 1 rotates in the sense indicated by arrow 11 in FIG. 3, torque will be generated in the direction indicated by arrow 12, and the forces represented by the unlabeled arrows will be exerted by connecting rods 6 and 7 and lever 5a, 5b on the linkages between these components.

Figure 2:
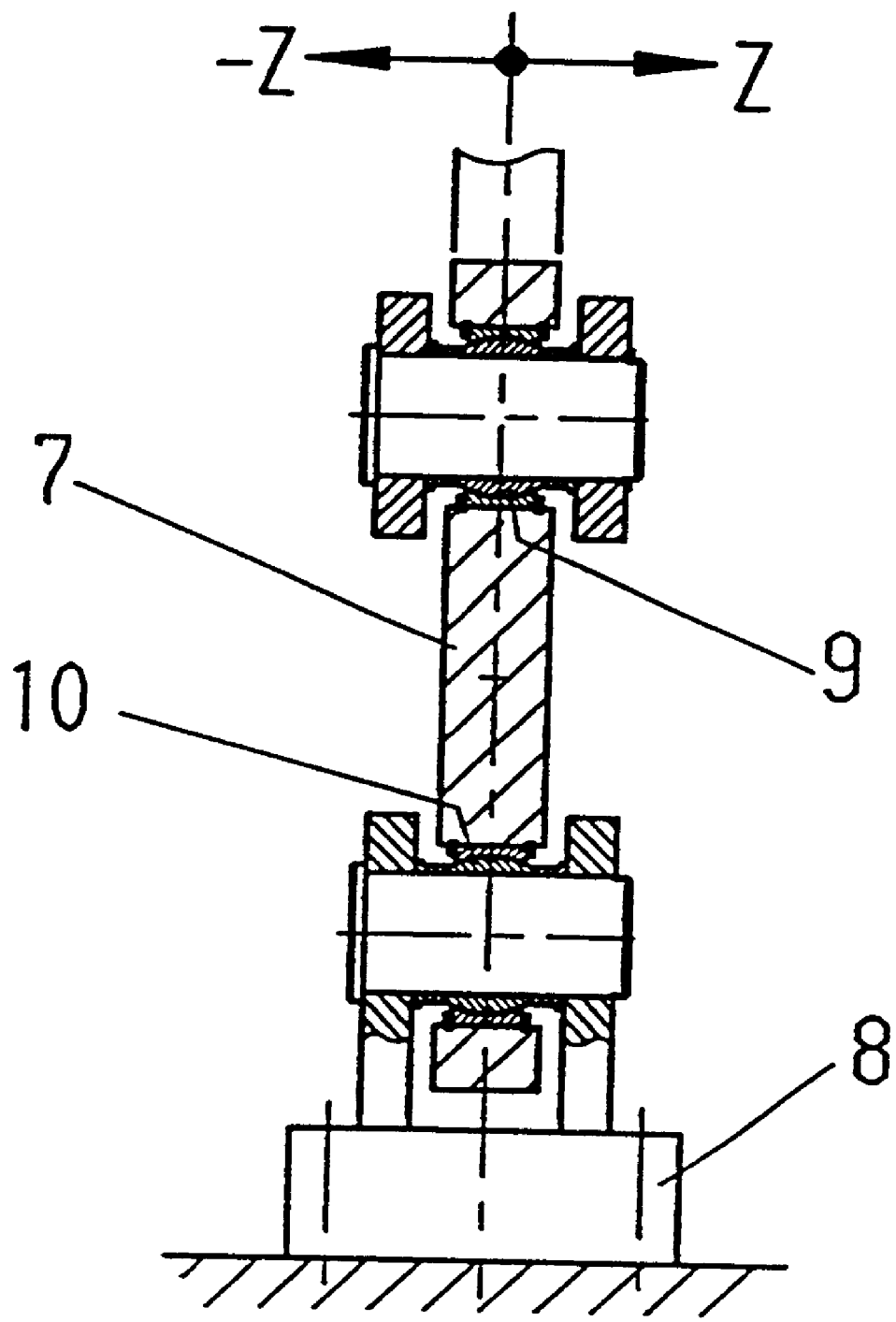
FIG. 2 is a section along the line II—II in FIG. 1.

The pivots 9 and 10 in primary connecting rods 7 are, as will be evident from FIG. 2, preferably universal bearings provided with spherical halves. This feature will allow motion in a third direction Z, −Z perpendicular to directions X, −X and Y, −Y.

Figure 4:
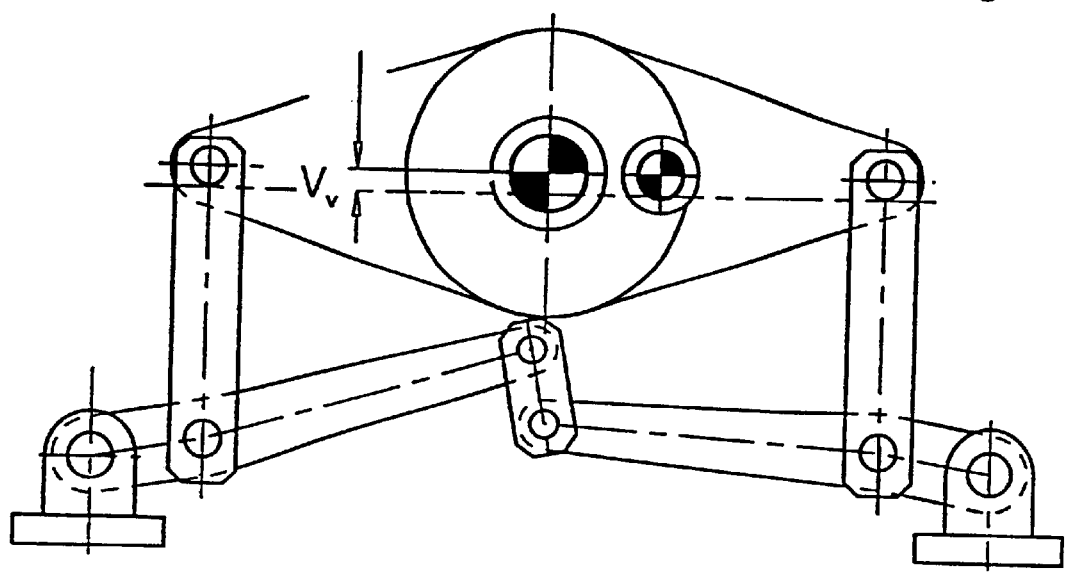
FIGS. 4 and 5 show the suspension illustrated in FIG. 3 during various states of displacement.
Figure 5:
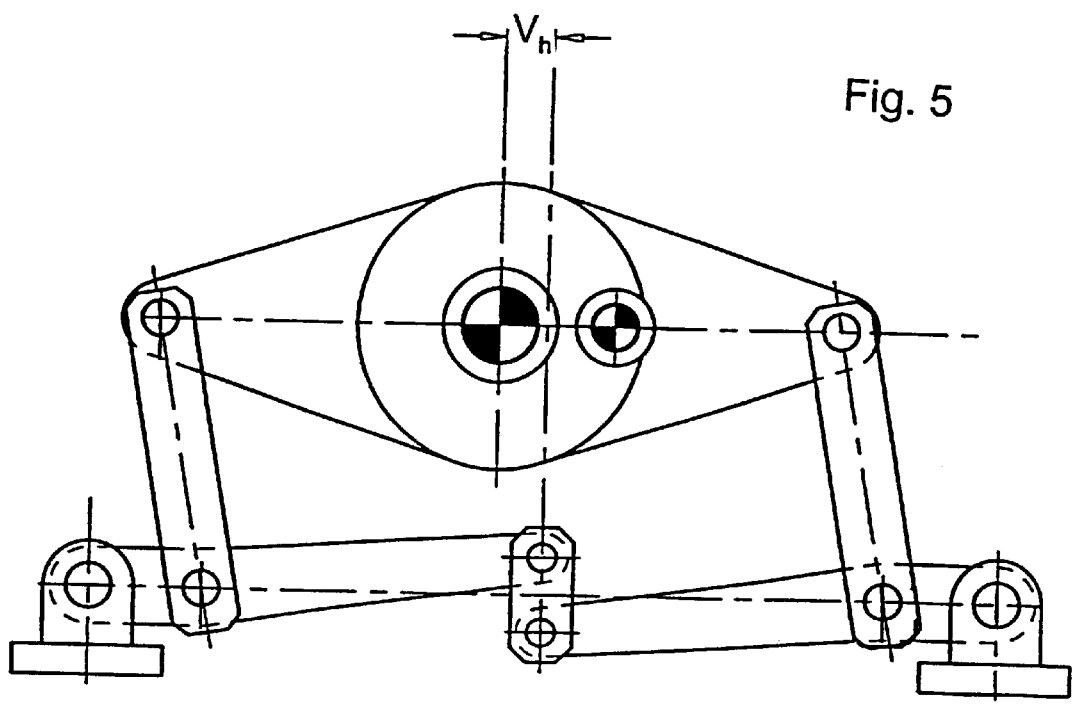

FIG. 4 illustrates the positions of the lever and connecting rods in the suspension illustrated in FIG. 3 with the shaft displaced vertically $V_V$. FIG. 5 illustrates the positions of the same components with the shaft displaced $V_H$ horizontally.

What is claimed is:

1. A double-sided torque support for a transmission mounted fixedly on a shaft of a machine and having a stationary part, comprising: a lever plate fastened to said stationary part of said transmission; a pair of primary coupling bars; two stationary pedestals pivotally connected to said lever plate through said pair of primary coupling bars; two first-class levers; two lever arms on each of said two first-class levers; a secondary coupling bar; said two first-class levers being arranged between said lever plate and said stationary pedestals; said lever arms facing each other and being pivotally connected with each other through said secondary coupling bar; said machine having a base, displacements of said shaft being transmitted free of force in relation to said base.

2. A torque support as defined in claim 1, wherein said lever plate is symmetrical with respect to a plane extending though said shaft.

3. A torque support as defined in claim 1, wherein said machine has a plane of symmetry, said secondary coupling bar being linked to said levers along said plane of symmetry.

4. A torque support as defined in claim 1, wherein said lever plate is pivotally connected to said primary coupling bars, each of said primary coupling bars being pivotally connected to one of said first-class levers; said lever arms of said first-class levers comprising inner arms and outer arms, said inner arms facing each other and pivotally connected with each other through said secondary coupling bar, said outer arms being pivotally connected to said stationary pedestals.

5. A torque support as defined in claim 1, wherein said primary coupling bars have universal bearings.

6. A torque support as defined in claim 1, wherein said transmission comprises a planetary gear, said shaft being torsion-resistant, said transmission exerting opposing torque accommodated by said lever plate secured to said stationary part, said lever arms of said first-class levers being of unequal length; said first class levers providing displacement of said machine in both horizontal and vertical directions; said coupling bars having universal bearings with spherical halves for motion of said machine in a third direction perpendicular to said horizontal and vertical directions.

7. A torque support as defined in claim 1, wherein said lever plate is pivotally connected to each of said first-class levers; said lever arms of said first-class levers comprising inner arms and outer arms, said outer lever arms comprising said pair of primary coupling bars, said inner arms facing each other and pivotally connected with each other through said secondary coupling bar, said outer lever arms being pivotally connected to said stationary pedestals.

8. A double-sided torque support for a transmission mounted fixedly on a shaft of a machine and having a stationary part, comprising: a lever plate fastened to said stationary part of said transmission; a pair of primary coupling bars; two stationary pedestals pivotally connected to said lever plate through said pair of primary coupling bars; two first-class levers; two lever arms on each of said two first-class levers; a secondary coupling bar; said two first-class levers being arranged between said lever plate and said stationary pedestals; said lever arms facing each other and being pivotally connected with each other through said secondary coupling bar; said machine having a base, displacements of said shaft being transmitted free of force in relation to said base; said lever plate being symmetrical with respect to a plane extending through said shaft; said machine having a plane of symmetry, said secondary coupling bar being linked to said levers along said plane of symmetry; said lever plate being pivotally connected to each of said first-class levers; said lever arms of said first-class levers comprising inner arms and outer arms, said inner arms facing each other and pivotally connected with each other through said secondary coupling bar, said outer lever arms being pivotally connected to said stationary pedestals; said transmission comprising further a planetary gear, said shaft being torsion-resistant, said transmission exerting opposing torque accommodated by said lever plate secured to a said stationary part transmission, said lever arms of said first-class levers being of unequal length; said first class levers providing displacement of said machine in both horizontal and vertical directions; said coupling bars having universal bearings with spherical halves for motion of said machine in a third direction perpendicular to said horizontal and vertical directions.

9. A double-sided torque support for a transmission mounted fixedly on a shaft of a machine and having a stationary part, comprising: a lever plate fastened to said stationary part of said transmission; a pair of primary coupling bars; two stationary pedestals pivotally connected to said lever plate through said pair of primary coupling bars; two first-class levers; two lever arms on each of said two first-class levers; a secondary coupling bar; said two first-class levers being arranged between said lever plate and said stationary pedestals; said lever arms facing each other and being pivotally connected with each other through said secondary coupling bar; said machine having a base, displacements of said shaft being transmitted free of force in relation to said base; said transmission comprising further a planetary gear, said shaft being torsion-resistant, said transmission exerting opposing torque accommodated by said lever plate secured to said stationary part, said lever arms of said first-class levers being of unequal length; said first class levers providing displacement of said machine in both horizontal and vertical directions; said coupling bars having universal bearings with spherical halves for motion of said machine in a third direction perpendicular to said horizontal and vertical directions.

* * * * *